US008756861B2

(12) United States Patent
Ochiai et al.

(10) Patent No.: US 8,756,861 B2
(45) Date of Patent: Jun. 24, 2014

(54) GERMINATED SEEDS POSSESSING INCREASED WATER-SOLUBLE POLYPHENOLS AND METHOD OF MANUFACTURING

(75) Inventors: Koji Ochiai, Napa, CA (US); Nobuko Ueda, Napa, CA (US)

(73) Assignee: Seedlife Tech. Inc, Shiga-ken (JP)

( * ) Notice: Subject to any disclaimer, the term of this patent is extended or adjusted under 35 U.S.C. 154(b) by 111 days.

(21) Appl. No.: 11/849,213

(22) Filed: Aug. 31, 2007

(65) Prior Publication Data

US 2008/0008812 A1   Jan. 10, 2008

Related U.S. Application Data

(63) Continuation-in-part of application No. 11/603,604, filed on Nov. 21, 2006.

(60) Provisional application No. 60/806,249, filed on Jun. 29, 2006.

(51) Int. Cl.
*A01C 1/02* (2006.01)

(52) U.S. Cl.
USPC ...... 47/58.1 SE; 426/542; 426/561; 426/425; 426/418; 47/58.1 LS

(58) Field of Classification Search
None
See application file for complete search history.

(56) References Cited

U.S. PATENT DOCUMENTS

| 2,500,775 | A | * | 3/1950 | Stewart | 165/250 |
| 2,522,409 | A | * | 9/1950 | Stoller | 504/323 |
| 4,519,163 | A | * | 5/1985 | Bonner | 47/58.1 R |
| 4,926,598 | A | * | 5/1990 | Chung | 47/61 |
| 6,099,844 | A | * | 8/2000 | Rohde et al. | 424/728 |
| 6,387,418 | B1 | * | 5/2002 | Aviram et al. | 424/744 |
| 6,544,581 | B1 | * | 4/2003 | Shrikhande et al. | 426/655 |
| 2004/0161524 | A1 | * | 8/2004 | Sakai et al. | 426/655 |
| 2006/0153957 | A1 | | 7/2006 | Ochiai et al. | |
| 2006/0280819 | A1 | * | 12/2006 | Alkayali | 424/769 |

FOREIGN PATENT DOCUMENTS

JP   2001-158739   6/2001

OTHER PUBLICATIONS

Yaginuma et al. "Polyphenol Increases in Safflower and Cucumber Seedlings Exposed to Strong Visible Lighty with Limited Water" 2002, Biosci. Biotechnol. Biochem., 66 (1) 65-72).*
Evans 2003, Greenhouse Management http://www.uark.edu/~mrevans/4703/learning_units/unit_11/unit_11.html).*
Kuznetsov et al. Oxygen Requirement of Germinating Flax Seeds 2003, Adv Space Res, vol. 31. No. 10, 2211-2214).*
Bon et al. (FR 2700246—1994 Derwent Abstract).*
Bioversity International Chap 61. Punicaceae http://www.bioversityinternational.org/publications/Web_version/52/ch46.htm.*
Dalimov et al."Chemical Composition and Lignins of tomato and Pomegranate Seeds" Chemistry of Natural Compounds vol. 39, No. 1, 2003 pg.*

(Continued)

*Primary Examiner* — Humera Sheikh
*Assistant Examiner* — Felicia King
(74) *Attorney, Agent, or Firm* — Sughrue Mion, PLLC

(57) ABSTRACT

A method and apparatus for increased yields of water-soluble polyphenols from plant seeds is provided. The method includes inducing seed germination within a selected range of temperatures. The method also includes inducing germination in an atmosphere having elevated carbon oxygen concentration and/or a reduced concentration of oxygen. The method further includes exposing the seeds to light and extracting water-soluble polyphenols with an aqueous solution without adding an organic solvent such as alcohol.

13 Claims, 8 Drawing Sheets

(56) References Cited

OTHER PUBLICATIONS

Seeram et al. "Pomegranates Ancient Roots to Modern Medicine" Taylor & Francis 2006 p. 36.*
A. Urbonaviciute, et al. "The Effect of Elevated CO2 Concentrations on Leaf Carbohydrate, Chlorophyll Contents and Photosynthesis in Radish", Jun. 2, 2006 Polish Journal of Environ. Stud, vol. 15. No. 6 pp. 921-925.*
EC Stryjewski, WC Piastuch, "Alterations in Arabidopsis thaliana leaf structure induced by super elevated CO2 concentrations" Oct. 1995, ASGSB Bull 9:76 Abstract.*
Mohammad Babar Ali et al. CO2—induced total phenolics in suspension cultures of Panax ginseng C.A. Mayer roots: roel of antioxidants and enzymes Apr. 15, 2005 PlantPhysiology and Biochemistry vol. 43 pp. 449-457.*
Sylvan H. Wittwer—From the Fall 1992 Issue of Policy Review "Rising Carbon Dioxide is Great for Plants" pp. 1-7.*
Bioversity International "Chapter 74 Vitaceae" http://www2.bioversityinternational.org/publications/Web_version/52/ch59.htm, Total pp. 5.*
Claudine Manach et al. "Polyphenols: food source and bioavailability" 2004 The American Journal of Clinical Nutrition vol. 79 pp. 727-747.*
C. Negro et al. "Phenolic Compounds and antioxidant activity from red grape marc extracts" 2004 Bioresource Technology vol. 87 pp. 41-44.*
E Otal. et al. "Anaerobic degradation of p-coumaric acid and pre-ozonated synthetic water containing this compound" 2004 Biocehmical Engineering Journal vol. 20 pp. 29-34.*
Pei-Yin Lin and Hsi-Nei Lin "Bioactive Compounds in Legumes and Their Germinated Products" Journal of Agricultural and Food Chemistry vol. 54, Published May 3, 2006 pp. 3807-3814.*
Bram et al. "Seed germinability and its seasonal onset of Japanese knotweed (*polygonum cuspidatum*)" 2004 Weed Science vol. 52 pp. 759-767.*
Yilmaz et al. "Major Flavonoids in Grape Seeds and Skins: Antioxidant Capacity of Catechin, Epicatechin, and Gallic Acid" 2004 Journal of Agricultural and Food Chemistry vol. 52 pp. 255-260.*
Zhang et al. Antioxidant Activity of Anthraquinones and Archives of Pharmacal Research 2005 vol. 28 No. 1 pp. 22-27.*
http://www.wuestgroup.com/Solvent%20Properties.pdf "Common Organic Solvents . . ." 2 pages.*
Nagaoka et al., "Selective inhibitors of germination of legume seeds in activated sludge compost", Plant Growth Regulation, 20: 295-301, 1996.
Greenhouse Management, http://www.uark.edu/~mrevans/4703/learning_units/unit_11/unit_11.html, prior art date 2005.
Kuznetsov et al., "Oxygen Requirement of Germinating Flax Seeds", Adv. Space Res., 31: 2211-2214, 2003.
Pradhan, "Germination vigour of Himalayan alder seeds under controlled conditions", Tropical Ecology, 41: 103-106, 2000.

\* cited by examiner

GERMINATED SEEDS POSSESSING INCREASED WATER-SOLUBLE POLYPHENOLS AND METHOD OF MANUFACTURING

CROSS-REFERENCE TO RELATED APPLICATION(S)

This application is a continuation-in-part of application Ser. No. 11/603,604, filed Nov. 21, 2006, which is related to and claims priority from U.S. Provisional Patent Application Ser. No. 60/806,249 filed on Jun. 29, 2006.

DESCRIPTION OF THE INVENTION

1. Field of the Invention

The present invention relates to germinated seeds possessing increased water-soluble polyphenols and a method of manufacturing the same. According to the present invention germinated seeds containing large amounts of water-soluble polyphenols useful as a food, cosmetic, or pharmaceutical ingredient, are produced and water-soluble polyphenols are extracted from the seeds.

2. Background of the Invention

Polyphenols, which generally are compounds having phenolic hydroxy groups, are found in almost all plants. There are more than 5,000 types of polyphenols. Plant polyphenols are often classified into flavonoid type, phenolic acid type, ellagic acid type, lignan type, coumarin type, procyanin type, caffeic acid type, and others. Many of these compounds exhibit anti-oxidative effects, owing to an ability to combine with free radicals, as well as other biological activity. For example, antimutagenic effects, anticarcinoma effects, blood pressure controlling effects, antidiabetic effects, antiallergic effects, and the like have been reported in the literature (see, for instance, *Wine Chemistry* by Yair Margalit, The Wine Appreciation Guild, San Francisco, Calif., 1997). Hence consuming a suitable amount of polyphenols is believed to promote health. Therefore polyphenols are frequently added to health foods, pharmaceuticals, and cosmetics.

The polyphenols in plants and plant seeds are present in both water-soluble forms, as well as non-water soluble forms such as the aglycones. It is relatively difficult to extract the water insoluble polyphenols from the plant materials with water or buffered water solutions unless another solvent such as alcohol is added. Consequently alcohol is employed as an extraction solvent (Japanese Published Patent Application 2001-158739).

In addition, since water insoluble polyphenols are not well suited for aqueous solution, the scope of their application has tended to be limited. For example, even though water-insoluble polyphenols can be used in cosmetic creams, they are incompatible with cosmetic tonics that have no added alcohol. Furthermore, non-water soluble polyphenols are believed to be more difficult to absorb in the body when incorporated into health foods and the like or taken orally in capsule form, as compared with water-soluble polyphenols. Thus, even where a food product or the like contains water-insoluble polyphenols, absorption of these compounds is expected to be poor, thus providing little or no health benefit.

Accordingly there is a need for methods and processes for providing water-soluble polyphenols. As well, there has been a long felt need to produce plant seeds having greater amounts of water-soluble polyphenols and to extract these water-soluble polyphenols for use in food supplements, cosmetics and the like.

SUMMARY

The invention relates to a method for germinating plant seeds with water-soluble polyphenols comprising maintaining the seeds in an atmosphere comprising a carbon dioxide concentration of about 2000 ppm or greater, or an oxygen concentration of about 18 volume percent or lower, in single or in combination; and maintaining temperature of the plant seeds within a germinable range. In some aspects, the method includes hydrating the plant seeds by means such as misting, spraying or otherwise applying water to the plant seeds. In other aspects of the method the hydrating is before inducing germination or during germination, in single or combination. In further aspects, the method includes heating the plant seeds before inducing germination. Another aspect of the method includes irradiating the plant seeds with light. In a more specific aspect, the light comprises 5000 lux or greater for at least 2 hours per day.

Further aspects of the method include maintaining the plant seeds in an atmosphere comprising a carbon dioxide level in the range of about 2000 parts per million to 50,000 parts per million during at least 60 percent of a time period for inducing germination. In still further aspects, the plant seeds are maintained in an atmosphere comprising an oxygen concentration in the range of about 4 volume percent to 18 volume percent during at least 60 percent of a time period for inducing germination. In another aspect, the temperature of the seeds is maintained in the range of 20° C. to 45° C. In another aspect, the temperature is maintained in a range of 5° C. to 30° C. above the midpoint of the optimal germination temperature range of the plant seeds. An aspect of the method also comprises layering the plant seeds and adjusting the temperature by means comprising heat release from germination and temperature reduction by a water spray.

The invention also relates to a food product comprising water-soluble polyphenols or antioxidants, in single or combination, of plant seeds germinated in an atmosphere comprising a carbon dioxide concentration of about 2000 ppm or greater, or an oxygen concentration of about 18 volume percent or lower, in single or in combination, at a temperature maintained in the range of 20° C. to 45° C. In some aspects the seeds are hydrated or irradiated with light during germination, in single or in combination. In different aspects the irradiation is 5000 lux or greater for a least 2 hours per day. In another aspect, the temperature is maintained in a range of 5° C. to 30° C. above the midpoint of the optimal germination temperature range of the plant seeds.

In some aspects, the food product comprises a water-soluble extract of the plant seeds, with the polyphenols. In other aspects, the food product comprises plant seeds. In an aspect, the plant seeds comprising the food product have at least one milligram of the water-soluble polyphenol mixture per gram of plant seeds. In another aspect, they have at least two milligrams of water-soluble polyphenols per gram of the plant seeds. In further aspects the plant seeds comprise antioxidants in an amount of at least 40 μmol DPPH equivalents per gram of the plant seeds, have at least 8 times the water-soluble polyphenol content of the same ungerminated seeds, and/or consist essentially of seeds from plants of the Vitaceae family.

In a particular aspect of the present invention, a food product comprises water-soluble polyphenols or antioxidants, in single or in combination, of plant seeds germinated in an atmosphere comprising a carbon dioxide concentration of about 2000 ppm or greater, or an oxygen concentration of about 18 volume percent or lower, in single or in combination, at a temperature maintained in the range of 20° C. to 45° C., wherein the plant seeds are selected from a group consisting of pomegranate seeds and *polygonum cuspidatum* seeds, wherein the food product comprises the plant seeds, wherein the plant seeds comprise antioxidants in an amount of at least 40 µmol DPPH equivalents per gram of the plant seeds.

Another aspect of the invention is an apparatus for germinating plant seeds with increased levels of water-soluble polyphenols. The apparatus comprises means for maintaining the seeds in an atmosphere comprising a carbon dioxide concentration of about 2000 ppm or greater, or an oxygen concentration of about 18 volume percent or lower, in single or in combination. The apparatus further comprises means for maintaining temperature of the plant seeds within a germinable range; and means for hydrating the plant seeds. Another aspect of the apparatus comprises a light source for irradiating the plant seeds with 5000 lux or greater for at least 2 hours per day

BRIEF DESCRIPTION OF THE DRAWINGS

The present disclosure is illustrated in an exemplary manner by the accompanying drawings. The drawings and accompanying description should be understood to explain principles of the various embodiments rather than be limiting. Other embodiments will become apparent from the description and the following drawings.

DETAILED DESCRIPTION OF THE INVENTION

Figure 1:
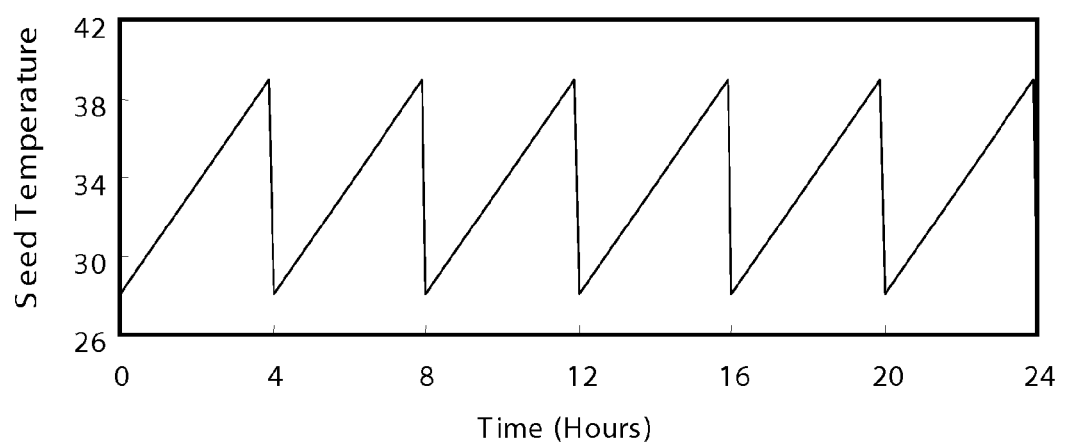
FIG. 1 shows the temperature of grape seeds in a 5 cm layer over a 24 hour period when germination is induced at an ambient temperature of 28° C. in container 800 of FIG. 8.

The present invention is directed to systems and methods for increasing the water-soluble polyphenol content in germinated seeds. According to some embodiments, a system and method are provided to induce germination by maintaining germinable plant seeds in an atmosphere having a carbon dioxide concentration of about 2000 ppm or greater and/or an oxygen concentration of about 18 percent by volume or lower, while maintaining the plant seeds at suitable germination temperature and spraying water on the plant seeds.

It will be understood that, although the terms first, second etc. may be used to describe various elements, these terms are only used to distinguish one element from another and the elements should not be limited by these terms. For example, a first element could be termed a second element, and, similarly a second element could be termed a first element without departing from the scope of the instant invention. The term "and/or" as used herein, includes any and all of the associated listed terms, in single or in combination.

In the following detailed description, reference is made to the accompanying drawings of specific embodiments. The aforementioned drawings are to illustrate the invention by way of particular examples, and are not intended to be limiting. These implementations are described in sufficient detail to enable those skilled in the art to practice the invention. Various other embodiments and implementations are also consistent with principles of the present invention. It is to be understood that other embodiments and implementations may be utilized and that structural changes and/or substitutions of various elements may be made without departing from the scope and spirit of present invention. The following detailed description is, therefore, not to be construed in a limited sense.

Polyphenol compounds originating from plants have two or more phenolic hydroxy groups within the same molecule. These polyphenols are often classified into types such as flavonoid type, phenolic acid type, ellagic acid type, lignan type, coumarin type, procyanin type, caffeic acid type, and others. More than 5,000 polyphenols originating from plants have been reported. Examples of particular polyphenols include catechin, tannin, anthocyanin, proanthocyanin, quercetine, isoflavone, rutin, chlorogenic acid, cacao mass polyphenols, xanthone, and derivatives. Large amounts of catechin are found in seeds from tea, apple, blueberry, and lotus root, whereas large amounts of tannin are found in the seeds of tea, persimmon, banana, and grape. Anthocyanin and proanthocyanin are relatively abundant in the seeds of grape, apple, and blueberry, quercetine is in onion, spinach, broccoli, and chrysanthemum seeds, isoflavone in soybean and clover seeds, rutin in buckwheat seeds, chlorogenic acid in potato, prune, and chrysanthemum seeds, cacao mass polyphenols in cacao and coffee seeds, and xanthone in mangosteen seeds.

It has been discovered that levels of water-soluble polyphenols in plant seeds increase when the seeds are germinated (U.S. patent application Ser. No. 11/246,442). Recently, it has been further discovered that the quantity of water-soluble polyphenols contained in germinated seeds can be significantly increased by adjusting the oxygen and/or the carbon dioxide content of the atmosphere in which the seeds are germinated, as well as temperature of the seeds before and during germination. In particular, it has been discovered that germinating seeds under atmospheric conditions having a carbon dioxide concentration of substantially 2000 ppm or greater and/or an oxygen concentration of substantially 18 percent by volume or lower enhances the amounts of water-soluble polyphenols in the germinated seeds.

Water soluble polyphenols are polyphenol compounds that can be extracted with water or a buffer solution without adding any organic solvent such as alcohol. For example, many glycoside polyphenols, in which a sugar is attached to a non-water soluble polyphenol (aglycones that are contained in large quantities in plant seeds), are water-soluble polyphenols. More specifically, rutin, daizin, naringin, hesperidin, and the like (i.e., glycoside flavonoids) are examples of water-soluble polyphenols. By contrast some polyphenols such as anthocyanidin are non-water soluble. However the anthocyanins, which are glycosides comprised of anthocyanidin (an aglycone) and sugar moieties, are water-soluble. In addition, glycoside proanthocyanidin, a glycoside of proanthocyanidin that is relatively abundant in grape seeds, is also a water-soluble polyphenol.

Various seeds also contain water insoluble polyphenols (for instance liposoluble aglycones). Aglycones are generally transformed into water-soluble polyphenols such as glycosides during germination by way of reactions that attach a sugar moiety to a polyphenol molecule. Examples of seeds in which amounts of water-soluble polyphenols have been found to increase by germination include: grape seeds and others from the Vitaceae family, sunflower, safflower, burdock seeds and others from the Asteraceae family; clover, peanut, fenugreek seeds and others from the Leguminosae family; *brassica* seeds and others from the Cruciferae (Brassicaceae) family; sesame seeds and others from the Pedaliaceae family; *perilla ocimoides*, linseed, *perilla frutescens*, rosemary, thyme, sage, mint seeds and others from the Labiatae family; buckwheat seeds and others from the Polygonaceae family; rice, corn, wheat, wild rice, barley, millet, Japanese millet seeds and similar; American red cherry, apricot, almond, plum, strawberry, and loquat seeds and others from the Rosaceae family, grapefruit, orange seeds and others from the Rutaceae family; St. John's wort, mangosteen seeds and others from the Guttiferae family; tomato, pepper seeds and others from the Solanaceae family; carrot seeds others from the Umbelliferae family; mango seeds and others from the Anacardiaceae family; pomegranate seeds and others from the Punicaceae family; *Polygonum cuspidatum* seeds, cacao seeds and others from the Sterculiaceae family, as well as seeds from the Rutaceae, Gingoaceae, Moraceae, Polygonaceae, Theaceae, Oleaceae, and Osmanthus families and the like.

Although the mechanisms causing increased amounts of water-soluble polyphenols in germinated plant seeds are not known in detail, a hypothesis appears to be consistent with effects that have been observed. However, the invention is not limited, in whole or in part, by the following hypothetical explanation.

It is thought that non-water soluble polyphenols in plant seeds are converted into water-soluble polyphenols, such as glycoside polyphenols, during the process of germination. It is hypothesized that conversion of the non-water soluble polyphenols is by way of an enzyme reaction or the like. However, some water-soluble polyphenols are thought to be consumed during germination, thereby reducing the net amount available for conversion into water-soluble polyphenols. The consumption of water-soluble polyphenols is thought to occur through seed respiration. Thus the consumption may be inhibited by limiting ambient concentrations of carbon dioxide and/or oxygen. In this manner the net production of water-soluble polyphenols in the germinated seeds can be increased.

However other effects are also thought to be operative. For example, it is believed that carbon dioxide levels according to the present disclosure may be operative to reduce the pH of seeds, and that the enzyme conversion reaction may be responsive to germination temperature, pH, and light irradiation. Of course the practice of the embodiments is not limited by these hypotheses nor are the embodiments dependent on, or limited by, any particular hypothesis or theory regarding the mechanisms.

Plant seeds that are capable of being germinated, and in which the water-soluble fraction of polyphenols in the seeds increases during germination, can be processed using the present method. Germinable seeds are seeds that are not in a "dormant state". Generally. plant seeds having a moisture content below about 9% to 12% are considered to be in a dormant state.

It has been found that plant seeds can be shifted from the dormant state to the germinable state by heating and/or hydrating the plant seeds. The heating and hydration can be performed simultaneously, or heating and hydration can be performed in separate steps. However, heating without hydration, or hydration without heating are also operable to put the seeds into a germinable state.

A combination of heating and hydration has been found to be particularly advantageous. Seeds put into a germinable state with a combination of heating and hydration generally have a greater water-soluble polyphenol content than seeds that are made germinable by either heating or hydration alone. Heating also accelerates germination. Furthermore, although seeds can be placed into a germinable state by hydration without heating, the germination yield can be improved by simultaneously heating and hydrating the seeds. Simultaneous heating and hydration may be performed by various methods. In one embodiment a method is by immersing the seeds in heated water for a determined period of time.

Seeds may also be put into a germinable state without performing any preprocessing. One method for putting seeds into a germinable state without preprocessing is by spraying water on seeds that are within a germinable temperature range.

According to one embodiment, plant seeds are heated to a temperature in the germinable range to put them into a germinable state for increasing polyphenols. In this embodiment the seed temperature is maintained above the optimal germination temperature, while being low enough to avoid denaturing the protein inside the plant seeds. In some embodiments the heating temperature for a plant is 5 to 30° C. higher than the midrange of optimal germination temperature.

Although the optimal germination temperature of plant seeds depends on the type of plant, it is often between 10° C. and 45° C. and more commonly in the range of 20° C. to 40° C. Examples of the optimal germination temperature range for seeds are: 20° C. to 35° C. for grape seeds; 20° C. to 35° C. for mung bean seeds; 18° C. to 30° C. for daikon seeds; and 10° C. to 30° C. for soybean seeds. The midrange of the optimal germination temperatures are therefore: 28° C. for grape seeds and mung bean seeds; 24° C. for daikon seeds; and 20° C. for soybean seeds.

It has been found that higher temperatures result in greater levels of water soluble polyphenols. The reason for this is believed to be related to certain proteins in the plant seeds. These proteins are thought to have an affinity for polyphenols. Hence they are expected to undergo competing reactions with polyphenols, thereby reducing the amounts of polyphenols available to form the desired water-soluble products.

Temperature increases within about 5° C. of the optimal germination temperature have little or no effect on the germination reactions that promote the production of water soluble polyphenols. However even a modest increase in temperature, as little as about 5° C., has been observed to improve the yield of water-soluble polyphenols. According to one hypothesis, it is thought that the increased yield is caused at least in part by promoting the denaturing of proteins. Lowering the protein levels is believed to avoid or suppress the rates of some competing reactions which would otherwise reduce the yield of water-soluble polyphenols. Although it is possible that this explanation accounts for some of the advantageous effects of hydration and temperature in the disclosed processes, practicing the processes, principles and embodiments disclosed herein does not depend on this explanation or any other theory.

According to various embodiments, heating temperatures that are 5° C. to 20° C. higher above the midrange of each respective optimal germination temperature are used. Hence temperatures, in the exemplary embodiment, are about 33° C. to 48° C. for grape and mung bean seeds and 25° C. to 50° C. for soybean seeds.

Although hydration and heating can be performed simultaneously, they can they can also be performed separately within the scope of the present method. Furthermore, plant seeds can also be hydrated by spraying water thereon in various steps such as during the germination step described below. Plant seeds are induced to shift from a dormant state to the germinating state by means of the heating described above and they absorb large amounts of moisture when germination begins.

It has been discovered that the quantity of water-soluble polyphenols in germinated seeds is affected by carbon dioxide and/or oxygen levels in the atmosphere. By itself, increased ambient carbon dioxide levels enhances the production of water-soluble polyphenols in the germinated seeds. Reducing the oxygen content also enhances the production of water-soluble polyphenols. However more water-soluble polyphenols can be obtained when the concentrations of carbon dioxide and oxygen are both adjusted (e.g. carbon dioxide is increased and oxygen reduced). Furthermore, controlling the germination temperature, spraying water on the seeds, and irradiating the seeds with light, in single or in combination, further augment the quantity of water-soluble polyphenols in the germinated seeds.

The ambient oxygen level for increasing the quantity of water-soluble polyphenols in germinated seeds is not particularly critical so long as it is lower than the normal atmospheric oxygen concentration (20 percent). Ambient oxygen concentrations in the range of 4 to 20 volume percent are operable, although in various embodiments, adjusting the oxygen content to be in a range of 4 to 18 percent by volume, or in the range of 4 to 15 volume percent, have been particularly effective. Although oxygen concentrations below 4 volume percent are operable, at this level the respiration of the seeds is often poor, and the amounts of water-soluble polyphenols produced may be diminished.

It has been hypothesized that reduced oxygen concentration inhibits reactions that consume water-soluble polyphenols inside the seeds. However the embodiments do not depend on this or any other theory, and are not limited by any theory.

The ambient oxygen concentration may be reduced by placing seeds in an incubator, dessicator, cultivation room, or other environment in which oxygen content can be externally adjusted. However, it is also possible to reduce and adjust the proximate oxygen concentration surrounding the seeds by allowing the germinated seeds to consume the oxygen by means of respiration in a closed or poorly ventilated system. For example, in some embodiments, the plant seeds are configured in layers within a sealable container. Oxygen in the container is consumed by seeds that have begun to germinate, thereby reducing the surrounding oxygen concentration. In order to prevent an excessive decrease in the oxygen concentration in various embodiments, controlled amounts of normal atmospheric air are continuously admitted to displace air in the container. In further embodiments, the oxygen concentration is controlled by periodically admitting normal air after determined time intervals. In a further embodiment described below, the replenishment of air between layered seeds with normal atmospheric air is by means of a water spray.

The oxygen concentration during the germination inducement may be maintained at a fixed concentration of, for example, 5 volume percent, 10 volume percent, 15 volume percent, or the like, but alternatively it may be substantially maintained at 18 volume percent or lower. In this regard the substantially means maintaining the designated concentration objective at least 60 percent or more of the total time period for inducing the seeds to germinate. In most applications it is desirable for the concentration to be held close to the designated concentration for larger fractions of the germinating time (e.g. 90 percent of the total time is preferred to 80 percent, 80 percent is preferred to 70 percent, etc.). Within this meaning, the time during which the designated concentration is maintained can be continuous or it may consist of a number of separate intervals.

The carbon dioxide level is not particularly critical. In general, carbon dioxide levels greater than normal levels in the atmosphere tend to enhance the amounts of water-soluble polyphenols in germinated seeds. As pointed out above, it has been hypothesized that carbon dioxide inhibits consumption of the water-soluble polyphenols in the seeds, although the methods and embodiments do not depend on this hypothesis nor are they limited by it. The carbon dioxide concentration is preferably from 2,000 ppm (0.2 volume percent) to 100,000 ppm (10 volume percent), but in various embodiments it can be from 4,000 ppm (0.4 volume percent) to 50,000 ppm (5 volume percent), and 12,000 ppm (1.2 volume percent) to 20,000 ppm (2 volume percent). At carbon dioxide concentration levels below about 2,000 ppm, water-soluble polyphenol enhancement is often insignificant. Carbon dioxide levels greater than about 10%, on the other hand, may tend to cause seed damage. To some degree these limits depend on the type of plant, temperature and other variables.

The carbon dioxide level concentration may be adjusted by placing seeds in an incubator, dessicator, cultivation room, or other environment in which the ambient carbon dioxide content can be externally adjusted. However, it is also possible to increase and adjust the proximate ambient carbon dioxide concentration without the use of any special device by allowing the germinated seeds to emit metabolically-produced carbon dioxide in a restricted flow environment. For example, by layering the plant seeds in a sealed or partly sealed container, the carbon dioxide emitted by the seeds will accumulate in the container thereby increasing the proximate carbon dioxide concentration. In order to avoid excessive carbon dioxide levels in various embodiments, controlled amounts of normal atmospheric air are continuously admitted to displace air in the container. In further embodiments, normal atmospheric air is intermittently introduced at determined time intervals. In some embodiments, as described below, the replenishment of air between layered seeds with normal atmospheric air is by means of a water spray.

In various embodiments, the carbon dioxide concentration during the germination inducement is maintained at a designated fixed level of, by way of example, 2,000 ppm, 10,000 ppm, or 50,000 ppm. In different embodiments it is substantially maintained at a designated level of, for example, 12,000 ppm. In this regard substantially maintained means maintaining the designated concentration during at least 60 percent or more of the total time period for inducing the seeds to germinate. In most applications it is advantageous for the concentration to be held close to the designated concentration for larger fractions of the germinating time (e.g. 90 percent of the total time is preferred to 80 percent, 80 percent is preferred to 70 percent, etc.). Within this meaning, the time during which the designated concentration is maintained can be continuous or it may consist of a number of separate intervals.

Temperature during the germination inducement is not limited, as long as the temperature is within a range that can germinate plant seeds. The temperature that can germinate seeds varies according to the variety of plant seeds used, but can, for example, be within the range of optimal germination temperature for that plant. As noted above, the optimal germination temperature of plant seeds depends on the plant. Generally, the optimal germination temperature range is between 10 and 50° C. In some embodiments the range is 20 to 45° C., and in other embodiments it is 26 to 42° C. In some embodiments, the plant seeds may be maintained at a fixed germination temperature during germination inducement, and in other embodiments the seeds are maintained within a fixed temperature range. In the various embodiments where plant seeds are held in a fixed temperature range, often the temperature repeatedly rises and falls.

In various embodiments the temperature is controlled by employing an incubator capable of adjusting the temperature, or employing a cultivation room that can adjust the temperature. Conventional heaters, refrigeration, pneumatic and electronic control equipment and the like are used to maintain temperature in some embodiments. In some embodiments, germination temperature control comprises metabolic enthalpy released from the plant seeds during germination. In a number of these embodiments, regulating germination temperature comprises heat transfer to a water spray.

Various means to maintain a temperature or a temperature range are often used in conjunction. For example, the germination temperature is adjusted in some embodiments by means of heat release from the germination and a water spray. In some embodiments, the plant seeds are often layered in several layers so as to inhibit heat transfer and confine the heat produced by germination. In these embodiments the temperature between the layered seeds tends to rise over a period of time. The temperature between the layered seeds can be also adjusted downward in order to maintain the temperature within a fixed temperature range, by introducing a water spray at fixed intervals. The illustrative data in FIG. 1 are for an embodiment in which the seed temperature repeatedly undergoes a gradual rise and fall within a germinating temperature range. In this embodiment the temperature is suitably adjusted by germination heat and a water spray.

In some embodiments the quantity of water-soluble polyphenols in germinated seeds is enhanced by maintaining the seeds at a suitable fixed temperature. In further embodiments, the temperature is repeatedly varied within a suitable range during germination to cause increased amounts of water-soluble polyphenols to be formed in the seeds. It is believed that interspersing gradual temperature increases and rapid temperature reduction within a temperature range is particularly beneficial for enhancing the amounts of water-soluble polyphenols.

Hydrating the seeds during germination inducement also serves to prevent the plant seeds from drying. Hydrating the seeds in this context includes applying water to the seeds by methods such as spraying water on the seeds, pouring water over the seeds, intermittent immersion in water, and exposing seeds to a fog, mist or other form of aqueous aerosol, as well as maintaining the humidity at a relatively high level (a relatively high level is a level that is at least 80% of saturation at a temperature within the seed germination temperature range), and preventing the seeds from drying. In various embodiments, a water spray during the germination has multiple functions of maintaining a temperature or temperature range and maintaining the humidity.

The temperature of the water to be sprayed is not particularly limited, but is at a temperature within the germination temperature range. In particular, when the temperature conditions are adjusted in a predetermined range using water spraying, the water spray temperature is at a comparatively low value within the germination temperature range. For cleanliness, in various embodiments an anti-bacterial agent is added to the water used in water spraying to prevent the growth of bacteria and the like. In some embodiments 10 ppm of sodium hypochlorite is used as an anti-bacterial agent, but various other antibacterial compounds are also useful.

Light irradiation of the seeds when inducing germination enhances the production of water-soluble polyphenols still further. In some embodiments a light from a normal plant cultivation fluorescent tube is used for illuminating the seeds. In other embodiments multispectral light sources such as three wavelength types, four wavelength types, UV, infrared, and the like are used alone or in combination. The light radiation time is not particularly critical, however an illumination time of at least two hours or more is useful. Still longer illumination times are beneficial, including continuous illumination (e.g. 24 hours in embodiments having a 24 hour germination inducement period). The intensity of the light is advantageously set in the range of 20 $\mu mol/m^2$-sec to 100 $\mu mol/m^2$-sec.

"Germinated seeds" will be understood to mean seeds that have shifted from the dormant state into the germinable state. For example, seeds that have received a "heat shock" in the heating step, and whose moisture content has been raised in the hydration step, are included. Hence hydrated seeds in which a sprout has seemingly not appeared are, nonetheless, included within the meaning of "germinated seeds" for the present invention. Of course seeds that have germinated and in which a sprout has grown are "germinated seeds." The germinated seeds of the present invention contain an average amount of water-soluble polyphenols that is 1.5 times or greater than the amount of water-soluble polyphenols found in non-germinated seeds in the dormant state.

Methods for extracting water-soluble polyphenols from germinated seeds are well known in the art and operable to practice the instant invention. For example, in some embodiments a product containing water-soluble polyphenols is obtained by crushing the germinated seeds. Water-soluble polyphenols are then extracted from the product using water or a water-based buffer. In general, the water or water-based buffer used contains no organic solvent.

As noted above, in some embodiments for germination the plant seeds are configured in layers within a sealed container or partly sealed container. By layering the plant seeds, the heat of germination is retained thus facilitating enzyme reactions. Furthermore, this configuration is advantageous for decreasing oxygen concentration and increasing the level of carbon dioxide in the environment surrounding the seeds. Owing to these conditions, the production of water-soluble polyphenols (antioxidants) is enhanced.

Figure 8:
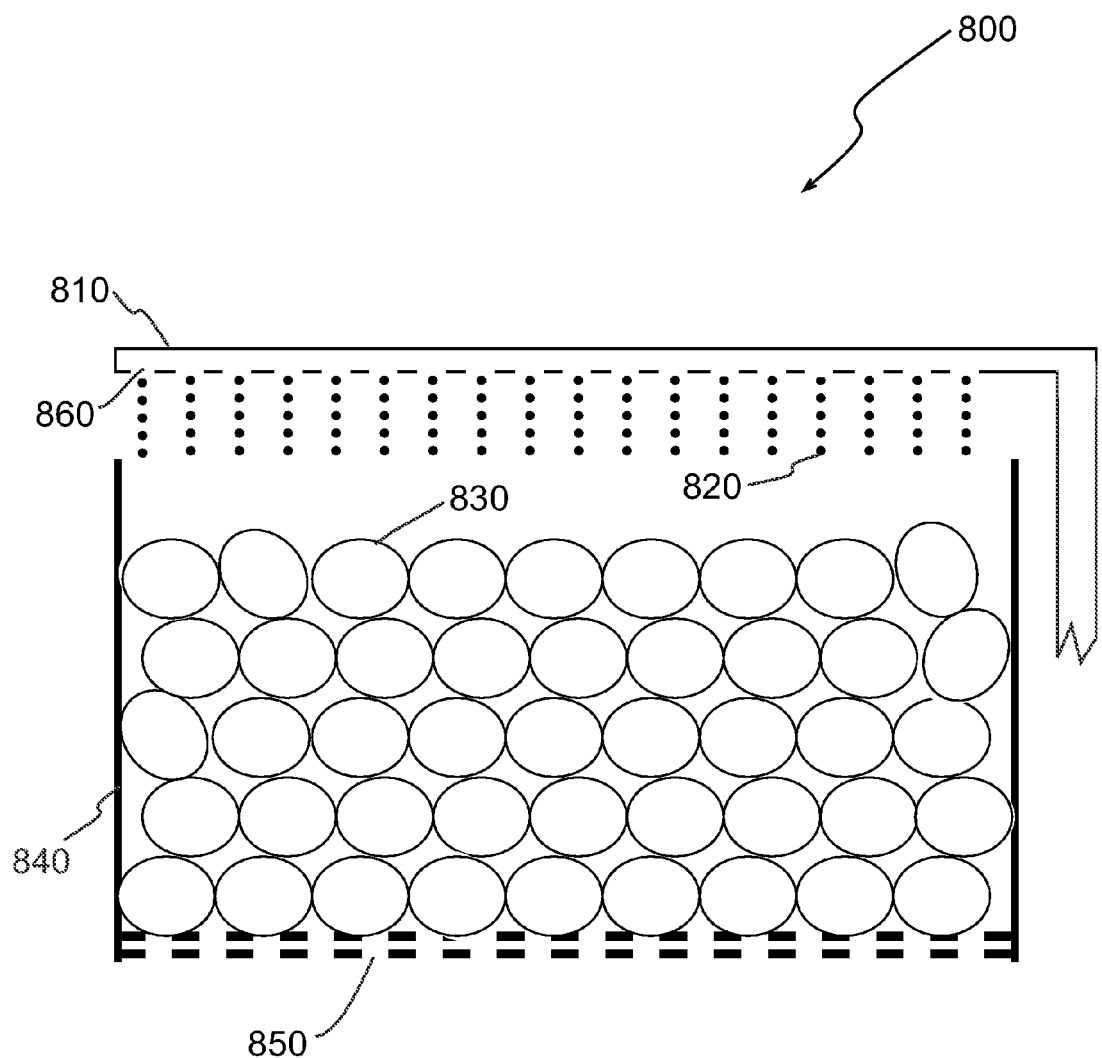
FIG. 8. is a diagram of container 800 of FIG. 8 with seeds.

An embodiment of a germination inducement container 800 is shown in FIG. 8. In this embodiment the plant seeds 830 are often layered. The upper portion 810 of the germination inducement container 800 can be open in use, or alternatively it can be closed. In one embodiment, the upper 810 and lower 840 portions of the container are sealed together in order to better manage the concentrations of carbon dioxide and oxygen, and the temperature within the container. In another embodiment, the container is operated in the open state inside of a cultivation room or the like. In a further embodiment the environment of the room including temperature, the carbon dioxide concentration and the oxygen concentration are controlled. In this further embodiment the carbon dioxide, oxygen and temperature within the container are similar to those in the room.

The germination inducement container 800 has nozzles 860 for spraying water 820 on the upper portion thereof. Drain ports 850 spaced at approximately 1 cm intervals along the bottom surface of the vessel discharge excess water from the spray. In various embodiments, the drain ports join to vertical tubulations (not shown) emerging from the bottom of lower container portion 840. Each tubulation is fitted to one arm of a u-shaped tube. The opposing arm of each u-tube is open to the ambient room environment. Hence when excess water from the spray fills the u-tubes to a certain height, water overflows the open arm so that the tubulation u-tube assembly acts as a siphon. The siphoning action empties the vessel after the water spray is shut off.

Using the instant method for manufacturing germinated seeds, the amount of water-soluble polyphenols in the germinated seeds is increased. In addition, because the germinated seeds of the present invention contain larger amounts of water-soluble polyphenols than non-germinated seeds, extraction and purification of the polyphenols from the seeds is readily performed without using organic solvents such as alcohol or the like. Furthermore, since the extracted water-soluble polyphenols contain no solvents such as alcohol or the like, they are easily adapted to health sensitive applications such as food products, health supplements, pharmaceuticals, cosmetics, and the like.

The principles of the method are now described with reference to exemplary embodiments that demonstrate the practical effects and utility. These embodiments are merely intended to teach the nature and application of the methods and apparatus and do not limit their scope or applications.

For these embodiments, the water-soluble polyphenol content of ungerminated seeds and germinated seeds was measured according with standard methods (for example, methods for measuring polyphenols are in *Bioengineering Experiments*, written by The Society for Biotechnology Japan and published by Baifukan). The seeds were crushed and water soluble polyphenols were extracted from the crushed seeds into water or aqueous buffer solutions free of organic solvent. The water soluble polyphenol concentration in the solutions was then measured using absorbance with reference to with a gallic acid standard. Polyphenols and glycosides were also confirmed by the Folin-Ciocalteu and phenol-sulfuric acid methods respectively. The compounds in the extract were also identified as water soluble polyphenol glycosides by a method using thin layer chromatography. The anti-oxidant activity of water-soluble polyphenols extracted from the germinated seeds in selected trials was measured by means of diphenylpicrylhydrazyl (DPPH) radical capture activity with reference to a Trolox (6-hydroxy-2,5,7,8-tetramethylchroman-2-carboxylic acid) standard.

EMBODIMENT 1

Increasing Water-Soluble Polyphenols in Grape Seeds 225 g of grape seeds were washed in running water, and were then immersed for 1 hour in an aqueous solution at 50° C. containing 100 ppm of sodium hypochlorite (an anti-bacterial agent). The seeds were removed, and then immersed in another 100 ppm sodium hypochlorite solution at 40° C. for 4 hours. Next, the seeds were washed in distilled water, and then dried with tissue paper. The seeds were then layered at a thickness of approximately 5 cm in a germination inducement container 800 (FIG. 8). The upper surface of the germination inducement container 800 was then sealed. The container was placed in a cultivation room with a room temperature of 28° C., and the seeds were sprayed with a 10 ppm sodium hypochlorite solution at 28° C. every 4 hours. Approximately 100 germinated seeds (4.12 g) were collected at 24 hours (1 day), 48 hours (2 days), 96 hours (4 days), and 168 hours (seven days).

4.12 g of the germinated seeds that were collected were placed in a mortar. 10 ml of distilled water was added thereto, and the seeds were crushed with a pestle. The crushed material was centrifuged for 15 minutes at 10000 g, and the supernatant was removed as an extract.

The polyphenols in the extract of the germinated grape seeds were then analyzed according to the aforementioned methods. The extract was found to have 302 µg of polyphenols by one method. An independent glycoside analysis found 366 µg of glycosides. Hence large amounts of a water-soluble glycoside polyphenol was produced. The most common polyphenol in grape seeds is proanthocyanidin, but the glycoside polyphenol contained in the germinated seeds is thought to be a glycoside polyphenol in which a sugar is attached to proanthocyanidin or a derivative thereof.

EMBODIMENT 2

Water-Soluble Polyphenols from Non-Germinated Grape Seeds

Approximately 100 grape seeds (4.12 g) from a juice pomace (Riesling type: moisture content of 9.5 to 11) were placed in a mortar, 10 ml of distilled water was added thereto, and the grape seeds were crushed with a pestle. This mixture was centrifuged for 15 minutes at 10000 g, and the supernatant was removed as an extract.

This extract contained approximately half the amount of water-soluble polyphenols found in the extract of grape seeds of Embodiment 1 that were germinated for 24 hours.

EMBODIMENT 3

Effect of Oxygen and Carbon Dioxide Concentrations 225 g of mung bean seeds, clover seeds, sunflower seeds, and citron seeds were each washed in running water, then immersed in an aqueous solution at 40° C. containing 100 ppm of sodium hypochlorite (an anti-bacterial agent) for 4 hours. Next, the seeds were washed in distilled water, and then dried with tissue paper. The seeds were then layered at a thickness of approximately 5 cm in germination inducement Container 800 (FIG. 8).

Germination inducement Container 800 was placed in a cultivation room at room temperature (28° C.) while the seeds were sprayed with a 10 ppm sodium hypochlorite solution at 28° C. every 4 hours during a 48 hour period in which germination was induced. Approximately 675 g of germinated seeds were collected.

4.12 g of the germinated seeds that were collected were placed in a mortar, 10 ml of distilled water was added thereto, and the seeds were crushed with a pestle. The crushed material was centrifuged for 15 minutes at 10000 g, and the supernatant was removed as an extract.

The seed temperature change while inducing germination in the mung bean seeds in the germination inducement container 800 was monitored during a 24 hour period beginning at the start of germination inducement. Seed temperature is the temperature as measured within 3 cm from the surface of the layered seeds. The cultivation room temperature was constant at 28° C., but the seed temperature inside the cultivation inducement container gradually increased owing to the germination heat release from the mung bean seeds. Four hours after germination inducement began, the temperature reached 39° C. before a 10 ppm sodium hypochlorite solution at a temperature of 28° C. was sprayed on the germinating seeds.

Figure 3:
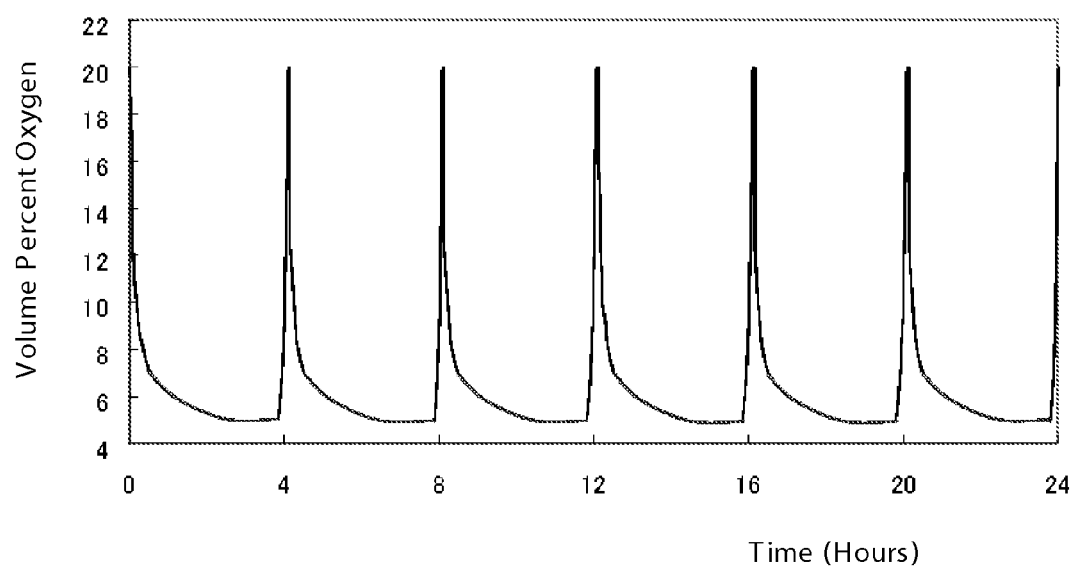
FIG. 3 shows ambient oxygen concentration over a 24 period during germination of mung bean seeds at an ambient temperature of 28° C. in container 800 of FIG. 8.

This spraying reduced the seed temperature to 28° C. (FIG. 1). Although this seed temperature was measured within 3 cm from the surface, other measurements at various other interior positions within the seed layers showed almost the same temperature-time dependence The change in oxygen concentration while inducing mung bean seed germination in germination inducement container 800 was measured over a 24 hour period from the start of germination inducement. The oxygen concentration is for a position within 3 cm of the surface of the layered seeds. At times when outside air was introduced in the process of spraying water, every 4 hours, the oxygen concentration intermittently increased to that of normal atmospheric air. After each spraying, oxygen was rapidly depleted by the germinating seeds, thereby reducing the oxygen concentration to well below 15 percent by volume (FIG. 3). Although oxygen concentration was sampled at a fixed position within about 3 cm of the seeds during these measurements, other data showed that there were no significant oxygen gradients within the layered seed bed.

Figure 5:
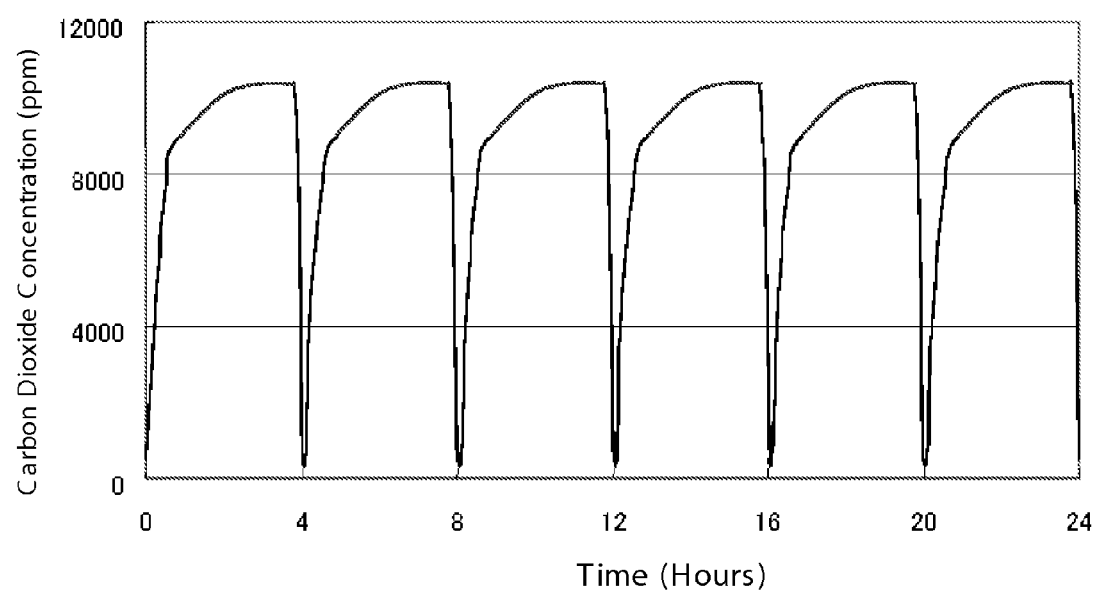
FIG. 5 shows ambient carbon dioxide concentration over a 24 period during germination of mung bean seeds at an ambient temperature of 28° C. in container 800 of FIG. 8.

The carbon dioxide concentration while inducing germination of the mung bean seeds in germination inducement container 800 was similarly measured over a 24 hour period from the start of germination inducement. The carbon dioxide concentration is also for a position within 3 cm of the surface of the layered seeds. Because outside air was introduced when the water was sprayed every 4 hours, the carbon dioxide concentration intermittently decreased to that of normal atmospheric air at these times, before being replenished by the germinating seeds. After spraying, carbon dioxide increased rapidly to levels above 8000 parts per million by volume (FIG. 5). Although the carbon dioxide concentration was sampled at a fixed position within about 3 cm of the seeds during these measurements, other measurements showed no significant carbon dioxide gradients within the layered seed bed.

EMBODIMENT 4

Figure 7:
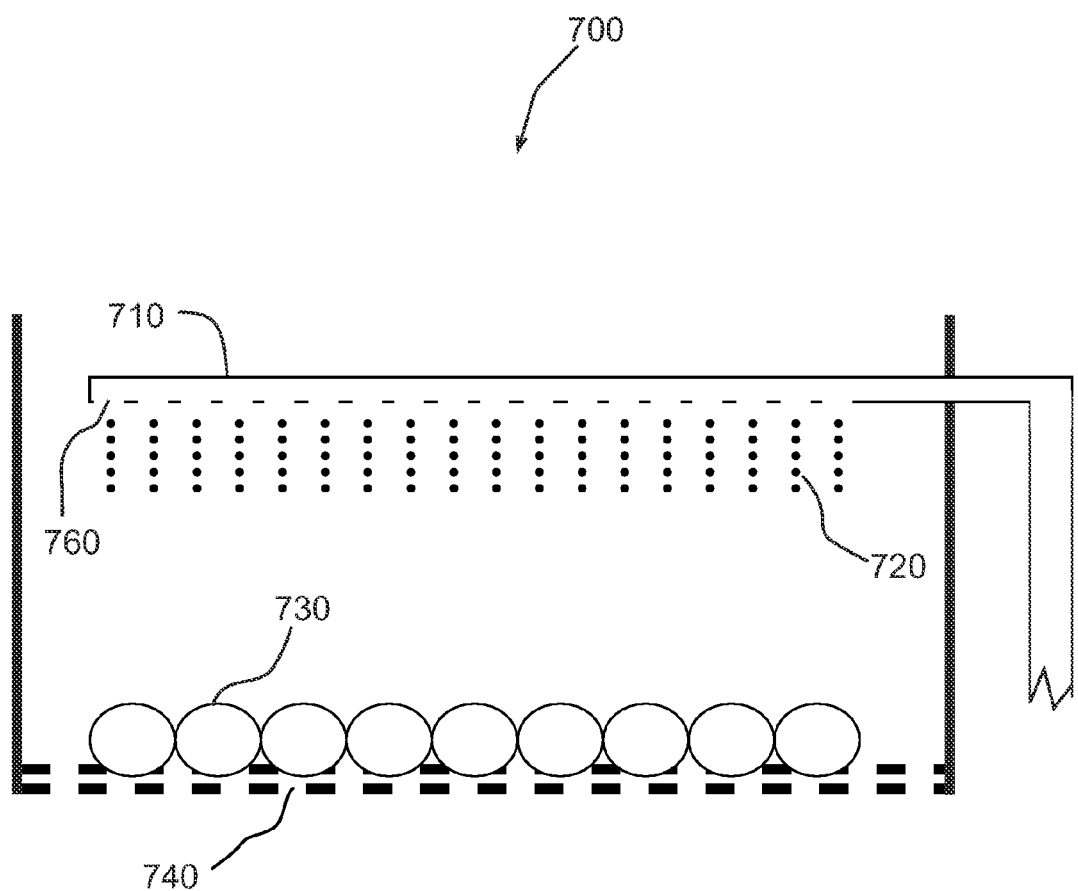
FIG. 7 is a diagram of container 700 of FIG. 7 with seeds.

Effect of Oxygen and Carbon Dioxide Concentrations 225 g of mung bean seeds, clover seeds, sunflower seeds, or citron seeds were variously washed in running water, then immersed, heated, and hydrated simultaneously for 4 hours in an aqueous solution at 40° C. containing 100 ppm of sodium hypochlorite (an anti-bacterial agent). Next, the seeds were washed in distilled water and then dried with tissue paper. The seeds were placed in a single layer in germination Container 700 (FIG. 7).

The upper surface 710 of the germination container 700 is open, and has nozzles 760 for spraying water 720 on the upper portion of seeds thereof 730. Water discharge ports 740 (drain ports) located at approximately 1 cm intervals in the bottom surface thereof discharge the excess water from the water spraying. Because the upper surface is open, and the container has a large number of water discharge ports, the oxygen concentration and carbon dioxide concentration inside the container are maintained at almost the same levels as normal ambient atmospheric air. In a first trial, the germination inducement container 700 was placed in a cultivation room at a temperature of 38° C. and the seeds were sprayed with a 10 ppm sodium hypochlorite solution at 36° C. every 4 hours. In a second trial, the germination inducement container 700 was placed in a cultivation room at a temperature of 28° C., and the seeds were again sprayed with a 10 ppm sodium hypochlorite solution at 27° C. every 4 hours. Approximately 675 g of germinated seeds were collected after 48 hours from each of these trials.

4.12 g of the germinated seeds collected from each of the trials were placed in mortars, 10 ml of distilled water was added thereto, and the seeds were crushed with a pestle. The crushed material was centrifuged for 15 minutes at 10000 g, and the supernatant was removed as an extract.

Figure 2:
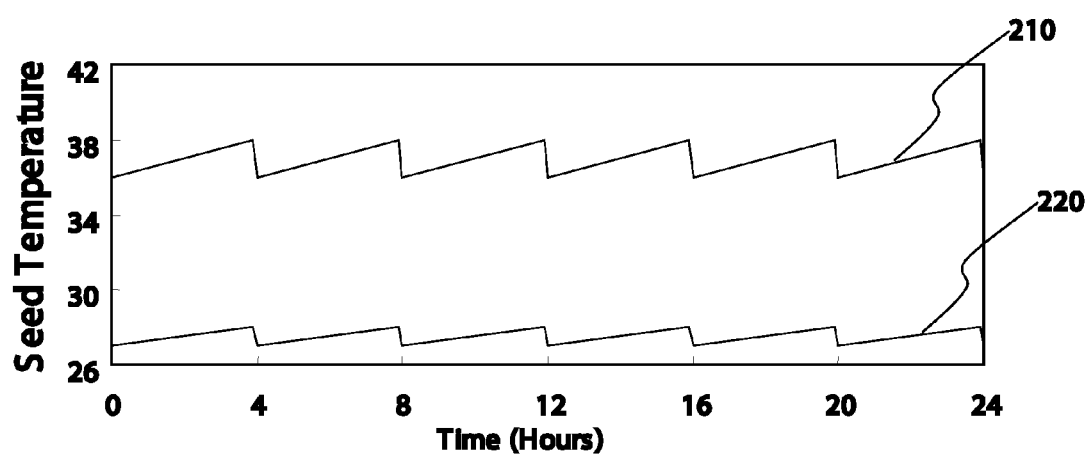
FIG. 2 shows the temperature of mung bean seeds in a single layer over a 24 hour period when germination is induced at ambient temperatures of 28° C. and 36° C. in container 700 of FIG. 7.

The change in temperature during the step of inducing germination in the mung bean seeds used in the germination container 700 was measured from the start of germination inducement to 24 hours later, as shown in FIG. 2. The temperature was measured above the surface of the single layer of seeds. When the cultivation room was at 38° C., the temperature dropped to 36° C. at the times when the 10 ppm sodium hypochlorite solution was sprayed on the seeds. Hence temperature was maintained between 36° C. and 38° C. during the first trial shown by curve 210 in FIG. 2. When the cultivation room was at 28° C., the temperature dropped to 27° C. at the times when the 10 ppm sodium hypochlorite solution was sprayed on the seeds. Hence the temperature was maintained between 27° C. and 28° C. during this second trial as shown by curve 220 in FIG. 2.

Figure 4:
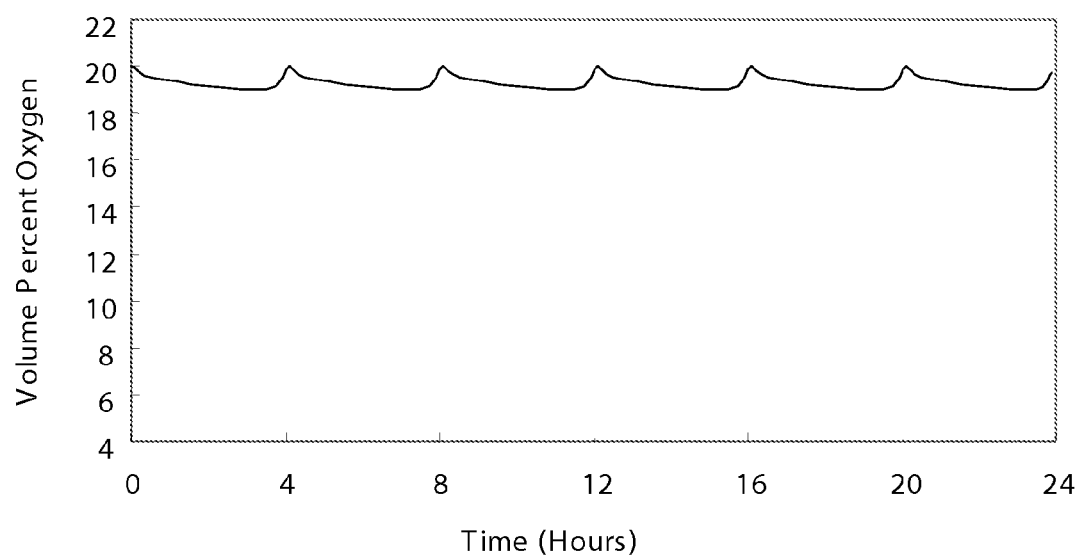
FIG. 4 shows ambient oxygen concentration over a 24 period during germination of mung bean seeds at ambient temperatures of 28° C. and 36° C. in container 700 of FIG. 7.

The change in oxygen concentration while inducing mung bean seed germination in germination inducement container 700 was measured over a 24 hour period from the start of germination inducement. The oxygen concentration is for a position at the surface of the single layer of seeds. The oxygen concentration remained at approximately 20 percent throughout the germination inducement step in each of the trials, as shown in FIG. 4.

Figure 6:
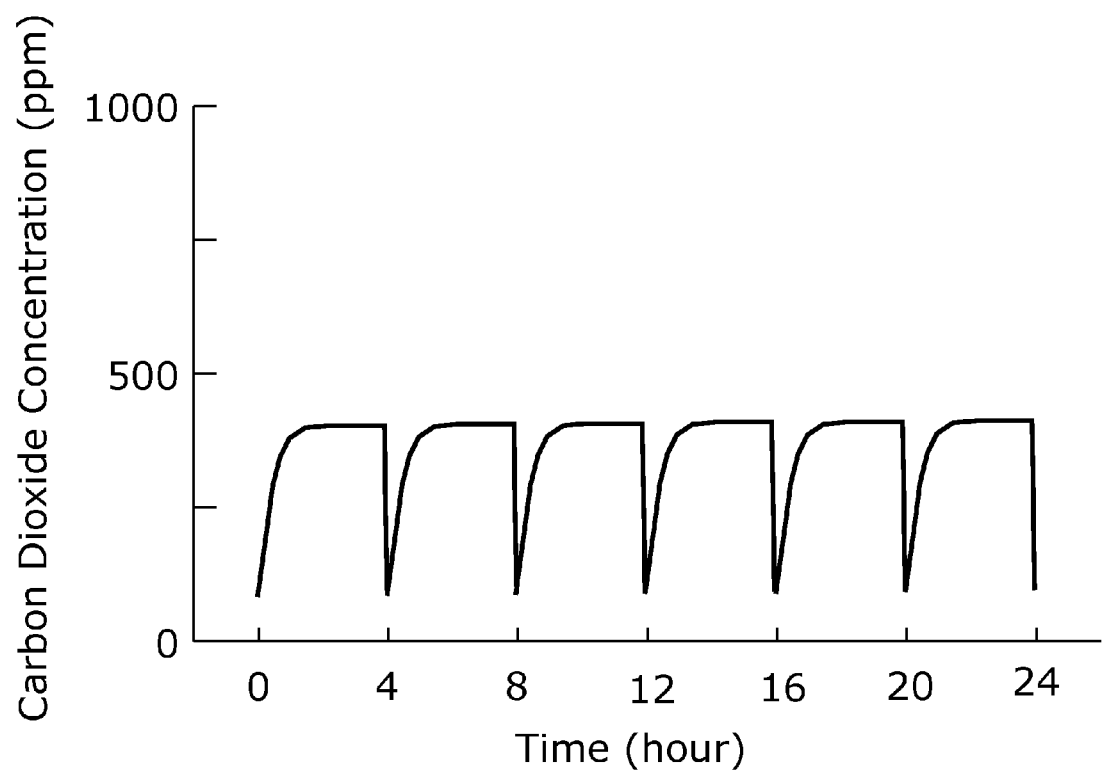
FIG. 6 shows ambient carbon dioxide concentration over a 24 period during the germination of mung bean seeds at an ambient temperature of 28° C. or 36° C. in container 700 of FIG. 7.

The carbon dioxide concentration for germination inducement of mung bean seeds in the germination container 700 was measured from the start of germination inducement until 24 hours later. The carbon dioxide concentration was measured at the surface of the single layer of seeds. The carbon dioxide concentration was approximately 300 ppm throughout the germination inducement step as shown in FIG. 6.

Analyses of Extracts

The extracts from the mung bean seeds, clover seeds, sunflower seeds, or citron seeds obtained in the above examples were analyzed according to the procedures described above.

As shown in TABLE 1, the germinated seeds contained more substantially more water-soluble polyphenols than the non-germinated seeds. The relative increase in water-soluble polyphenols for germinated mung bean seeds was more than a factor of 11, for germinated clover seeds it was a factor of 5 or more, for germinated sunflower seeds a factor of 4.1 times or more, and for germinated citron seeds a factor of 20 or more. By contrast, the amount of water-soluble polyphenols in the germinated seeds of Embodiment 4 was less than the germinated seeds of embodiment 3, even when the cultivation room temperature was 38° C. or 28° C. (Table 1).

TABLE 1

| | Milligrams Water-Soluble Polyphenols per Gram of Plant Seed | | | |
|---|---|---|---|---|
| Seeds | Embodiment 4 (38° C.) | Embodiment 4 (28° C.) | Embodiment 3 | Non-Germinated |
| Mung bean | 0.66 mg/g | 0.21 mg/g | 1.1 mg/g | 0.1 mg or less/g |
| Clover | 0.44 mg/g | 0.29 mg/g | 0.50 mg/g | 0.1 mg or less/g |
| Sunflower | 0.24 mg/g | 0.16 mg/g | 0.41 mg/g | 0.1 mg or less/g |
| Citron | 0.62 mg/g | 0.82 mg/g | 2.0 mg/g | 0.1 mg or less/g |

EMBODIMENT 5

Effect of Temperature 225 g of mung bean seeds, clover seeds, sunflower seeds, or grape seeds was washed in running water, were immersed, heated, and hydrated simultaneously for 4 hours in an aqueous solution containing 100 ppm of sodium hypochlorite at the optimal germination temperature (midrange), or a temperature 10° C. higher than the optimal germination temperature (midrange). Next, the seeds were washed in distilled water, and then dried with tissue paper. The seeds were then layered at a thickness of approximately 5 cm in germination inducement Container 800 of FIG. 8. The germination inducement Container 800 was placed in a cultivation room at room temperature (28° C.), the seeds were sprayed with a 10 ppm sodium hypochlorite solution at 28° C. every 4 hours, germination was induced for 8 hours, and approximately 675 g of germinated seeds were collected. The midpoint of the optimal germination temperatures for mung bean seeds is 28° C., the midpoint of the optimal germination temperatures for clover seeds is 24° C., the midpoint of the optimal germination temperatures for sunflower seeds is 24° C., and the midpoint of the optimal germination temperatures for grape seeds is 28° C.

4.12 g of the germinated mung bean, clover, sunflower, or grape seeds that were collected were placed in a mortar, 10 ml of distilled water was added thereto, and the seeds were crushed with a pestle. This was centrifuged for 15 minutes at 10000 g and the supernatant was removed as an extract.

The samples were analyzed for polyphenol content as described above. The results of these analyses are shown in Table 2. When the heating step was performed at a temperature 10° C. higher than the midrange of the optimal germination temperature, the increase in water-soluble polyphenols was significantly greater than when the heating step was performed at the midrange optimal germination temperature. With mung bean seeds, when the heating step was performed at temperatures 5° C., 20° C. and 30° C. above the optimal germination temperature, the increase in water-soluble polyphenols was also significantly enhanced over amounts observed when the heating step was performed at the midrange optimal germination temperature.

TABLE 2

Milligrams Water-Soluble Polyphenols per Gram of Plant Seed

| Seeds | Optimal Germination Temperature | 10 degrees Above Optimal Germination Temperature | Non-Germinated |
|---|---|---|---|
| Mung Bean | 0.3 mg/g | 0.68 mg/g | 0.5 mg/g |
| Clover | 0.3 mg/g | 0.5 mg/g | <0.1 mg/g |
| Sunflower | 0.11 mg/g | 0.44 mg/g | <0.1 mg/g |
| Grape | 0.1 mg/g | 0.51 mg/g | 0.6 mg/g |

EMBODIMENT 5

Effect of Oxygen Concentration

Grape seeds were used to examine the effects of reduced oxygen concentration on enhancing water-soluble polyphenols by germination. 225 g of grape seeds were washed in running water, and were then immersed for 4 hours in a 100 ppm sodium hypochlorite solution at 40° C.

Next, the seeds were washed in distilled water, and then dried with tissue paper. The seeds were then placed in a dessicator with air/nitrogen mixtures having oxygen concentrations adjusted to 5%, 10% and 15% respectively. The ambient atmosphere compositions were formed by admitting controlled flows of pure nitrogen gas and air into the dessicator. The normal atmospheric air has an oxygen concentration of approximately 21 volume percent. The carbon dioxide concentration in the dessicator was approximately 350 ppm under all conditions of this example. The temperature was maintained at 28° C. and the seeds were sprayed with a 10 ppm sodium hypochlorite solution at 28° C. every 4 hours. Germination inducement was performed for 48 hours and approximately 675 g of germinated seeds were collected.

4.12 g of the germinated seeds that were collected were placed in a mortar, 10 ml of distilled water was added thereto, and the seeds were crushed with a pestle. The crushed material was centrifuged for 15 minutes at 10000 g, and the supernatant liquid was removed as an extract. 250 µl of the germinated seed extract was analyzed.

Relative values of the seed extract antioxidant strength were measured as an absorbance, $A=\log_{10}(I_o/I)$ using the diphenylpicrylhydrazyl (DPPH)/Trolox radical scavenging activity method, where $I_o$ is the intensity of light in the absence of radicals, and I is the attenuated intensity, when radicals are present in the solution. This absorbance depends on the concentration of free radicals remaining after scavenging by antioxidant in the extract solution. The relative seed antioxidant strength for DPPH radicals is shown in Table 3 below. It is seen that reducing oxygen concentration below atmospheric levels results in at least a 5 fold increase in antioxidant strength to more than 40 µmol DPPH equiv./gm-seed.

TABLE 3

Measured Antioxidant strength of Germinated Pinot Gris Grape Seeds (DPPH Method)

| | Oxygen Concentration | | | |
|---|---|---|---|---|
| | 5% | 10% | 15% | 21% (Normal) |
| Antioxidant Strength (µmol DPPH equiv./gm-seed). | 45.9 | 45.3 | 41.3 | 8.0 |

EMBODIMENT 6

Effect of Carbon Dioxide Concentration

Grape seeds were used to examine the effect of carbon dioxide during the germination inducement. 225 g of grape seeds were washed in running water, and then immersed for 4 hours in a 100 ppm sodium hypochlorite solution at 40° C. Next, the seeds were washed in distilled water, and then dried with tissue paper.

The seeds were then placed in a dessicator, and air having carbon dioxide concentrations of 2,000 ppm (0.2 volume percent), 10,000 ppm (1 volume percent) and 50,000 ppm (5 volume percent) was flowed into the dessicator. The concentration of carbon dioxide in normal atmospheric air is approximately 300 ppm. The oxygen concentration was in the range of 20 to 21 volume percent under all conditions during these tests. The seeds were maintained at a temperature of 28° C. and sprayed with a 10 ppm sodium hypochlorite solution at 28° C. once every 4 hours. Germination was induced for a period of 48 hours. Approximately 675 g of germinated seeds were collected and 4.12 g of these germinated seeds were placed in a mortar, 10 ml of distilled water was added thereto, and the seeds were crushed with a pestle. The crushed material was centrifuged for 15 minutes at 10000 g, and the supernatant liquid was removed as an extract.

Relative values of the antioxidant strength of the obtained extract, measured with the diphenylpicrylhydrazyl (DPPH) radical scavenging activity method, are shown in Table 3 below. It is seen that increasing carbon dioxide concentration above normal atmospheric levels results in a more than 8 fold increase in antioxidant strength to over 40 μmol DPPH equiv./gm-seed.

TABLE 4

Measured Anti-oxidant Strength of Germinated Pinot Gris Grape Seeds (DPPH Method)

| | Carbon Dioxide Concentration | | | |
|---|---|---|---|---|
| | 2000 ppm | 10000 ppm | 50000 ppm | 350 ppm (Normal) |
| Antioxidant Strength (μmol DPPH equiv./gm-seed) | 24.1 | 42.9 | 41.3 | 8.0 |

This trend showing the antioxidant activity to increase with ambient carbon dioxide levels was confirmed for a wide variety of seeds (for example, seeds from Asteraceae, Leguminosae, Cruciferae, Labiatae, Rutaceae, Rosaceae, Ginkoaceae, Gramineae, Moraceae, Polygonaceae, Theaceae, and Oleaceae families, and more specifically, grape, sunflower, safflower, clover, *brassica*, sesame, *perilla ocimoides*, linseed, *perilla frutescens*, peanut, rice, buckwheat, corn, wheat, wild rice, barley, millet, Japanese millet, fenugreek, rosemary, thyme, sage, mint, American red cherry, apricot, almond, grapefruit, orange, plum, St. John's wort, tomato, strawberry, carrot, pepper, mangosteen, mango, loquat, burdock, and cacao seeds, among others).

EMBODIMENT 6

Effect of Light Irradiation

The germinating trials and analyses of Embodiments 3 and 4 with normal atmospheric oxygen and carbon dioxide concentrations (21 percent oxygen, 350 ppm carbon dioxide) were repeated while exposing the seeds to selected amounts of visible light irradiation. An ordinary fluorescent light tube was used to irradiate the seeds for periods of 0 hours (dark), 2 hours, 6 hours, and 24 hours. The light intensity was determined to be 5000 lux as determined by a simple photometer. Water-soluble polyphenols were extracted from seeds exposed for the various time periods.

Compared to dark conditions, the water-soluble polyphenols that were extracted from the seeds irradiated 2 hours or more a day had greater antioxidant activity. Although the amounts of antioxidants increased with germinating time even when seeds were not illuminated, the data show that that light radiation further increases the antioxidant content of seed extract. It is seen that illumination can increase the antioxidant levels of seeds by more than 50%, depending on the conditions.

TABLE 5

Measured Antioxidant Strength of Mung Bean Seeds (DPPH method, μmol DPPH equivalent/gm-seed)

| | Light Duration | | | |
|---|---|---|---|---|
| | 0 hours | 2 hours | 6 hours | 24 hours |
| Dark conditions | 24.1 | 22.6 | 25.3 | 39.9 |
| Light conditions | 24.1 | 41.7 | 24.6 | 47.6 |

The same trend was confirmed for many other seeds (for example, seeds from Asteraceae, Leguminosae, Cruciferae, Labiatae, Rutaceae, Rosaceae, Ginkoaceae, Gramineae, Moraceae, Polygonaceae, Theaceae, and Oleaceae families, and more specifically, grape, sunflower, safflower, clover, *brassica*, sesame, *perilla ocimoides*, linseed, *perilla frutescens*, peanut, rice, buckwheat, corn, wheat, wild rice, barley, millet, Japanese millet, fenugreek, rosemary, thyme, sage, mint, American red cherry, apricot, almond, grapefruit, orange, plum, St. John's wort, tomato, strawberry, carrot, pepper, mangosteen, mango, loquat, burdock, and cacao seeds, among others).

One skilled in the art will appreciate that, while specific examples and embodiments of the methods and apparatus have been described for the purposes of illustration, various modifications can be made without deviating from the spirit and scope of the present invention. For example, embodiments of the present invention may be applied to many different types systems for obtaining water-soluble polyphenols and antioxidant compounds from the seeds of many different kinds of plants. Since the invention facilitates the extraction and purification of polyphenols in seeds without using organic solvents, it is particularly useful for conventional and health foods, as well as pharmaceuticals, cosmetics and the like. Furthermore, although the illustrative embodiments comprise extraction from seeds using aqueous solutions, the invention may be applied in many different applications such as where, merely by way of example, seeds or byproducts of seeds are directly incorporated in food products. It will be very useful in virtually any application where water-soluble polyphenols are desired. Moreover, features of one embodiment may be incorporated into other embodiments, even where those features are not described together in a single embodiment within the present description. Therefore, the above description should not be taken as limiting the scope of the invention which is defined by the appended claims.

What is claimed is:

1. A method for germinating plant seeds containing water-soluble polyphenols comprising:
   arranging the seeds in multiple layers within a sealable container to induce an increase of carbon dioxide concentration and to induce a decrease of oxygen concentration during germination;
   maintaining the seeds in an atmosphere comprising at least one of a carbon dioxide concentration of greater than 2000 ppm and an oxygen concentration of about 18 volume percent or lower; and
   maintaining temperature of the plant seeds within a germinable range, wherein the temperature is maintained in the range of 20° C. to 45° C. and wherein the plant seeds are selected from the group consisting of pomegranate seeds and *polygonum cuspidatum* seeds thereby increasing the polyphenol content in the plant seeds;
   wherein normal atmospheric air is introduced into the sealable container during germination to control the carbon dioxide concentration and the oxygen concentration;

wherein the method further comprises at least one of (i) hydrating the plant seeds by at least one of spraying and misting water and (ii) irradiating the plant seeds with light, wherein the irradiating comprises irradiation at 5000 lux or greater for at least 2 hours per day.

2. The method of claim 1 wherein the hydrating comprises spraying water.

3. The method of claim 1 comprising hydrating the plant seeds before inducing germination.

4. The method of claim 1 further comprising heating the plant seeds before inducing germination.

5. The method of claim 1 wherein the plant seeds are maintained in an atmosphere comprising a carbon dioxide level in the range of more than 2000 parts per million to about 50,000 parts per million during at least 60 percent of a time period for inducing germination.

6. The method of claim 1 wherein the plant seeds are maintained in an atmosphere comprising an oxygen concentration in the range of about 4 volume percent to 18 volume percent during at least 60 percent of a time period for inducing germination.

7. The method of claim 1, further comprising maintaining temperature in a range of 5° C. to 30° C. above the midpoint of the optimal germination temperature range of the plant seeds.

8. The method of claim 1 further comprising layering the plant seeds and adjusting the temperature by means comprising heat release from germination and temperature reduction by a water spray.

9. The method of claim 1 wherein the atmosphere comprises carbon dioxide in a concentration of from 4,000 ppm to 50,000 ppm.

10. The method of claim 1 wherein the atmosphere comprises carbon dioxide in a concentration of from 12,000 ppm to 20,000 ppm.

11. The method of claim 1, wherein the seeds are pomegranate seeds.

12. A method for producing a food product, comprising:
    obtaining germinated plant seeds with the method for germinating plant seeds containing water-soluble polyphenols of claim 1,
    extracting the water-soluble polyphenols from the germinated plant seeds by using water or a water-based buffer without using any other organic solvent to provide extracted water-soluble polyphenols, and
    producing a food product with the extracted water-soluble polyphenols.

13. The method of claim 12, wherein the method for germinating plant seeds comprises hydrating the plant seeds before inducing germination.

* * * * *